United States Patent
Pillai et al.

(10) Patent No.: US 12,270,925 B2
(45) Date of Patent: Apr. 8, 2025

(54) INDOOR LOCATION POSITION SYSTEM AND METHOD

(71) Applicants: Ajay R. Pillai, West Windsor, NJ (US); Shamala Ajay, West Windsor, NJ (US)

(72) Inventors: Ajay R. Pillai, West Windsor, NJ (US); Shamala Ajay, West Windsor, NJ (US)

(*) Notice: Subject to any disclaimer, the term of this patent is extended or adjusted under 35 U.S.C. 154(b) by 396 days.

(21) Appl. No.: 17/474,799

(22) Filed: Sep. 14, 2021

(65) Prior Publication Data

US 2022/0082650 A1   Mar. 17, 2022

Related U.S. Application Data

(60) Provisional application No. 63/077,795, filed on Sep. 14, 2020.

(51) Int. Cl.
*G01S 1/76*      (2006.01)
*G01S 1/08*      (2006.01)
(Continued)

(52) U.S. Cl.
CPC .............. *G01S 5/0264* (2020.05); *G01S 1/08* (2013.01); *G01S 1/72* (2013.01); *G01S 1/725* (2013.01);
(Continued)

(58) Field of Classification Search
CPC . G01S 5/0264; G01S 1/08; G01S 1/72; G01S 1/725; G01S 1/76; G01S 5/0045;
(Continued)

(56) References Cited

U.S. PATENT DOCUMENTS 9,244,150 B2 *   1/2016   Sathish ............... G01S 5/02521
9,557,402 B2 *   1/2017   Bartov ................... G01S 11/16
(Continued)

FOREIGN PATENT DOCUMENTS

EP      3145260 A1      3/2017
WO      2019160340 A1   8/2019

OTHER PUBLICATIONS

PCT International Search Report and Written Opinion mailed Feb. 24, 2022 for International Application No. PCT/US2021/050193, 12 pages.

*Primary Examiner* — Isam A Alsomiri
*Assistant Examiner* — Abdallah Abulaban
(74) *Attorney, Agent, or Firm* — RMCK Law Group, PLC

(57) ABSTRACT

A location position system can include a plurality of beacons arranged a grid formation divided into a plurality of sub-grids. A mobile computing device can implement a location position application and can receive a radio signal from a particular beacon of the plurality of beacons. The radio signal can comprise a data component uniquely identifying the particular beacon, which can be used to identify a particular sub-grid of the plurality of sub-grids. An audio signal can be received from each of a set of sub-grid beacons associated with the particular sub-grid. Each audio signal can: (i) have a frequency in the frequency range of 16 kHz to 24 kHz and a transmission delay from a reference time, (ii) lack any additional identifying data, and (iii) be separately transmitted from the radio signal transmitted by the particular beacon. The mobile computing device can determine its position based on the received audio signals.

7 Claims, 11 Drawing Sheets

(51) Int. Cl.
  *G01S 1/72*    (2006.01)
  *G01S 5/00*    (2006.01)
  *G01S 5/02*    (2010.01)
  *G01S 5/30*    (2006.01)
  *H04W 84/18*   (2009.01)

(52) U.S. Cl.
  CPC .............. *G01S 1/76* (2013.01); *G01S 5/0045* (2013.01); *G01S 5/0268* (2013.01); *G01S 5/30* (2013.01); *G01S 2205/02* (2020.05); *H04W 84/18* (2013.01)

(58) Field of Classification Search
  CPC ...... G01S 5/0268; G01S 5/30; G01S 2205/02; H04W 84/18
  See application file for complete search history.

(56) References Cited

U.S. PATENT DOCUMENTS

| | | | |
|---|---|---|---|
| 9,609,482 B1* | 3/2017 | Want | H04W 4/025 |
| 9,955,315 B2* | 4/2018 | Svenér | H04W 4/33 |
| 2009/0295639 A1* | 12/2009 | Zhao | G01S 5/30 |
| | | | 342/387 |
| 2018/0356520 A1* | 12/2018 | Booij | H04B 11/00 |
| 2019/0208490 A1* | 7/2019 | Booij | H04W 64/00 |
| 2019/0312861 A1 | 10/2019 | Kairi et al. | |
| 2020/0367011 A1* | 11/2020 | Morgan | H04W 48/12 |

\* cited by examiner

INDOOR LOCATION POSITION SYSTEM AND METHOD

CROSS-REFERENCE TO RELATED APPLICATIONS

This application claims the benefit of U.S. Provisional Application No. 63/077,795, filed on Sep. 14, 2020. The disclosure of the above application is incorporated herein by reference in its entirety.

FIELD

The present disclosure is directed to an indoor location position system and method and, more particularly, to a location position system that can identify a position of a mobile computing device based on the use of both radio signals and audio signals.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Location position systems enable locating the position of objects or people within a geographic area. For example only, the Global Positioning System ("GPS") is a satellite based radio navigation system that is a well-known location position system for determining the position of a GPS receiver on Earth. The GPS service utilizes GPS signals transmitted from satellites to GPS receivers. The GPS signals include a data payload that is used by a GPS receiver to calculate its position. The use of GPS signals result in some shortcomings to the GPS system. For example, GPS signals are relatively weak and can be easily blocked by obstacles (buildings, mountains, etc.). Therefore, the GPS system may not be accurate, reliable, or even available for use in "indoor" locations.

Accordingly, various indoor positioning systems have been developed to address limitations of the GPS and other similar positioning systems. Existing indoor location position systems can also suffer from various shortcomings/limitations. For example only, Bluetooth™ Low Energy ("BLE") beacons can be used to implement an indoor location position system. Similar to the GPS systems discussed above, such BLE and other similar systems utilize a location signal that includes a data payload. A receiver device receives the BLE location signal, extracts the data payload, and uses the data payload to determine its position. Such BLE systems tend to have coarse precision/accuracy, be slow when updating position, and can be highly susceptible to the environment of use (people, metal, shelves, product on shelves, and other obstacles).

An improved indoor location position system and method that addresses the above limitations and others of existing systems would be desirable.

SUMMARY

According to some implementations of the present disclosure, a mobile computing device implementing a location position application for use with a location position system is disclosed. The location position system can comprise a plurality of beacons arranged in a location area. The plurality of beacons can be arranged in a grid formation that is divided into a plurality of sub-grids. The mobile computing device can include at least one microphone, at least one antenna, one or more processors, and a non-transitory computer-readable storage medium. The at least one microphone can be configured to receive audio signals in a frequency range of 16 kHz to 24 kHz. The at least one antenna can be configured to receive radio signals. The one or more processors can be coupled to the at least one microphone and the at least one antenna and be configured to receive the audio signals and the radio signals. The non-transitory computer-readable storage medium can have a plurality of instructions stored thereon. When the stored instructions are executed by the one or more processors, the stored instructions cause the one or more processors to perform various operations. The operations can include receiving a radio signal from a particular beacon of the plurality of beacons. The radio signal can comprise a data component uniquely identifying the particular beacon. The operations can also include identifying a particular sub-grid of the plurality of sub-grids in the grid formation based on the received radio signal. The particular sub-grid can be associated with a set of sub-grid beacons of the plurality of beacons. Further, the operations can include receiving an audio signal from each of the set of sub-grid beacons. Each audio signal can: (i) have a frequency in the frequency range of 16 kHz to 24 kHz and a transmission delay from a reference time, (ii) lack any additional identifying data, and (iii) be separately transmitted from the radio signal transmitted by the particular beacon. The operations can additionally include determining a position of the mobile computing device based on the received audio signals.

In some aspects, the operations can further comprise transmitting the data component to a server computing device associated with the location position system; and receiving, from the server computing device and in response to transmitting the data component, grid formation setup data sufficient to identify: (i) the grid formation, and (ii) which sub-grid beacon of the set of sub-grid beacons corresponds to a received audio signal.

In some aspects, the audio signals can be received from the set of sub-grid beacons have a common frequency and different transmission delays.

In some aspects, the audio signals can be received from the set of sub-grid beacons have different frequencies and a common transmission delay.

In some aspects, the audio signals can be received from the set of sub-grid beacons have different frequencies and different transmission delays.

In some aspects, the radio signal can comprise a Bluetooth™ Low Energy signal.

In some aspects, the set of sub-grid beacons can comprise four beacons.

In some aspects, the data component further can include grid formation setup data sufficient to identify: (i) the grid formation, and (ii) which sub-grid beacon of the set of sub-grid beacons corresponds to a received audio signal.

In some aspects, the mobile computing device can comprise a mobile phone.

According to alternative implementations of the present disclosure, a location position system is disclosed. The location position system can include a plurality of beacons and a mobile computing device. The plurality of beacons can be arranged in a location area and in a grid formation divided into a plurality of sub-grids. The mobile computing device can implement a location position application. Further, the mobile computing device can include at least one microphone, at least one antenna, one or more processors, and a non-transitory computer-readable storage medium. The at least one microphone can be configured to receive audio signals in a frequency range of 16 kHz to 24 kHz. The at least one antenna can be configured to receive radio signals. The one or more processors can be coupled to the at least one microphone and the at least one antenna and be configured to receive the audio signals and the radio signals. The non-transitory computer-readable storage medium can have a plurality of instructions stored thereon. When the stored instructions are executed by the one or more processors, the stored instructions cause the one or more processors to perform various operations. The operations can include receiving a radio signal from a particular beacon of the plurality of beacons. The radio signal can comprise a data component uniquely identifying the particular beacon. The operations can also include identifying a particular sub-grid of the plurality of sub-grids in the grid formation based on the received radio signal. The particular sub-grid can be associated with a set of sub-grid beacons of the plurality of beacons. Further, the operations can include receiving an audio signal from each of the set of sub-grid beacons. Each audio signal can: (i) have a frequency in the frequency range of 16 kHz to 24 kHz and a transmission delay from a reference time, (ii) lack any additional identifying data, and (iii) be separately transmitted from the radio signal transmitted by the particular beacon. The operations can additionally include determining a position of the mobile computing device based on the received audio signals.

In some aspects, the location position system can further include a server computing device. The mobile computing device can transmit the data component to the server computing device. The server computing device can transmit, in response to receiving the data component from the mobile computing device, grid formation setup data to the mobile computing device. The grid formation setup data can be sufficient to identify: (i) the grid formation, and (ii) which sub-grid beacon of the set of sub-grid beacons corresponds to a received audio signal.

In some aspects, the audio signals received from the set of sub-grid beacons can have a common frequency and different transmission delays.

In some aspects, the audio signals received from the set of sub-grid beacons can have different frequencies and a common transmission delay.

In some aspects, the audio signals can be received from the set of sub-grid beacons have different frequencies and different transmission delays.

In some aspects, the radio signal can comprise a Bluetooth™ Low Energy signal.

In some aspects, the set of sub-grid beacons can comprise four beacons.

In some aspects, the data component further can include grid formation setup data sufficient to identify: (i) the grid formation, and (ii) which sub-grid beacon of the set of sub-grid beacons corresponds to a received audio signal.

In some aspects, the mobile computing device can comprise a mobile phone.

In some aspects, identifying the particular sub-grid of the plurality of sub-grids in the grid formation can be further based on grid formation setup data, the grid formation setup data being sufficient to identify: (i) the grid formation, and (ii) which sub-grid beacon of the set of sub-grid beacons corresponds to a received audio signal.

In some aspects, the grid formation setup data can include line-of-sight compensation data. Further, determining the position of the mobile computing device based on the received audio signals can comprise: (i) determining an initial position estimate based on the received audio signals; (ii) determining whether line-of-sight compensation is appropriate based on the initial position and the line-of-sight compensation data; and (iii) when line-of-sight compensation is appropriate, adjusting a time of arrival for at least one of the received audio signals to obtain one or more time adjusted audio signals, wherein determining the position of the mobile computing device is based on the received one or more time adjusted audio signals.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
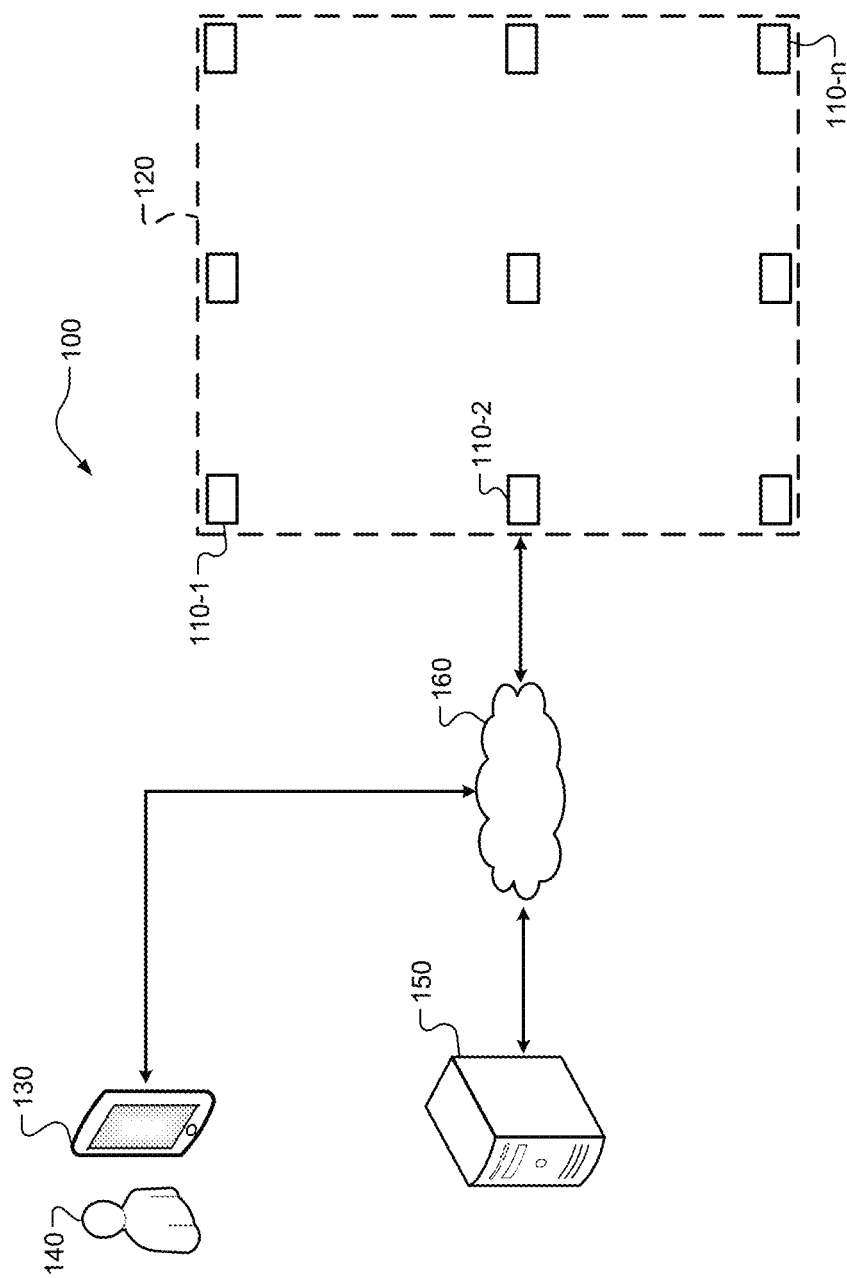
FIG. 1 is a diagram of an example indoor location position system including an example mobile computing device and an example server computing device according to some implementations of the present disclosure.

As briefly mentioned above, existing indoor position systems can suffer from many limitations. For example only, existing systems may suffer from increased power use at the beacons or other transmitters due to the need to transmit a sufficiently strong signal for reception by the receiving devices in an indoor location. In order to use less power, however, some existing signals utilize a low power solution (such as BLE systems) that may not provide sufficient accuracy, precision, and/or reliability. Furthermore, some existing systems require two-way communication between the system (e.g., beacons) and receivers, which increases power use and introduces lag into the system. Such two-way communication also enables a "tracking" system in which the system as a whole is aware of the location of each of the receivers in the system. While such a tracking system may be appropriate for single party location systems (such as a manufacturer that wishes to track and monitor the position of goods in a warehouse), these systems may not be readily adopted by independent users who do not wish to be accurately tracked in a controlled location (shoppers in a mall, spectators in a sports stadium, patrons in a museum, etc.) because of privacy concerns.

In order to address the above and other limitations/concerns with existing location position systems, the present disclosure is directed to improved indoor location position systems and methods ("techniques"). The disclosed techniques utilize beacons that separately output both: (i) radio signals, and (ii) audio signals that are utilized by a receiving device implementing a novel location determination algorithm to determine an accurate position of the receiving device in an indoor location. The beacons are arranged in a grid formation throughout the indoor location, where the grid formation can include (in some implementations and depending on the size of the indoor location) a plurality of sub-grids and associated sub-grid beacons. The beacons utilize the transmitted radio signal to transmit data (e.g., via encoded messages and/or signal strength) to the receiving devices, where the transmitted data uniquely identifies the particular beacon that transmitted the radio signal received at the receiving device. Further, the received data is sufficient for the receiving device to identify in which particular sub-grid of the plurality of sub-grids the receiving device is located.

The receiving device can be provided with grid formation setup data regarding the grid formation as well as information regarding the transmission details of the transmitted audio signals. The grid formation setup data can be sufficient to identify the grid formation and which sub-grid beacon of the set of sub-grid beacons corresponds to a received audio signal. For example only, the grid formation setup data can identify the precise positions of each of the beacons in the grid formation (and sub-grids, if applicable) and the transmission details regarding the audio signal transmitted from each of the beacons. The receiving device can determine from which particular beacon an audio signal was received based on the transmission details of the audio signal and the grid formation setup data.

When the receiving device receives an audio signal, the receiving device can determine from which beacon (in the grid as a whole, or in the particular sub-grid in which it is located as determined based on the radio signal) the audio signal was transmitted based on the transmission details. The audio signals do not carry a data component (such as any encoded information) or signal to be decoded by the receiving device. Instead, the receiving device can determine from which beacon an audio signal was transmitted based on the frequency of the audio signal and/or a transmission delay as specified in the grid formation setup data. By not including a data component in the transmitted audio signal, the present techniques eliminate many of the problems associated with data transmission in a "noisy" environment (e.g., signal degradation affecting signal to noise ratio, packet loss, and increases in power/delay due to a computationally intensive decoding process). Once a sufficient number of audio signals have been received and correlated with their transmitting beacons, the receiving device can determine its position based on a time-of-arrival or similar position determination algorithm. In this manner, a receiving device can determine its accurate position in an indoor location quickly, without sharing its position or other details with the location position system as a whole, and in a computationally efficient manner. Further example details of the disclosed techniques will be discussed below.

Referring now to FIG. 1, an indoor location position system 100 can include a plurality of beacons 110-1, 110-2, . . . 110-n (collectively and individually referred to herein as "beacon(s) 110") arranged in a location area 120, a mobile computing device 130 associated with a user 140, and a server computing device 150. The beacons 110, mobile computing device 130, and server computing device 150 can communicate directly to each other and/or through a network 160. The indoor position location system 100 can be configured to implement the location position application described herein. The indoor position location system 100 can include one or more example mobile computing devices 130 and one or more example server computing devices 150 according to some implementations of the present disclosure. For ease of description, in this application and as shown in FIG. 1, one example mobile computing device 130 and one example server computing device 150 are illustrated and described. It should be appreciated, however, that there can be more mobile computing devices 130 and more server computing devices 150 than is illustrated. While illustrated as a mobile phone, each mobile computing device 130 can be any type of suitable computing device, such as a tablet computer, a laptop computer, a tag/dongle/card or other similar hardware element, a wearable computing device such as eyewear, a watch or other piece of jewelry, or clothing that incorporates a computing device.

Figure 2:
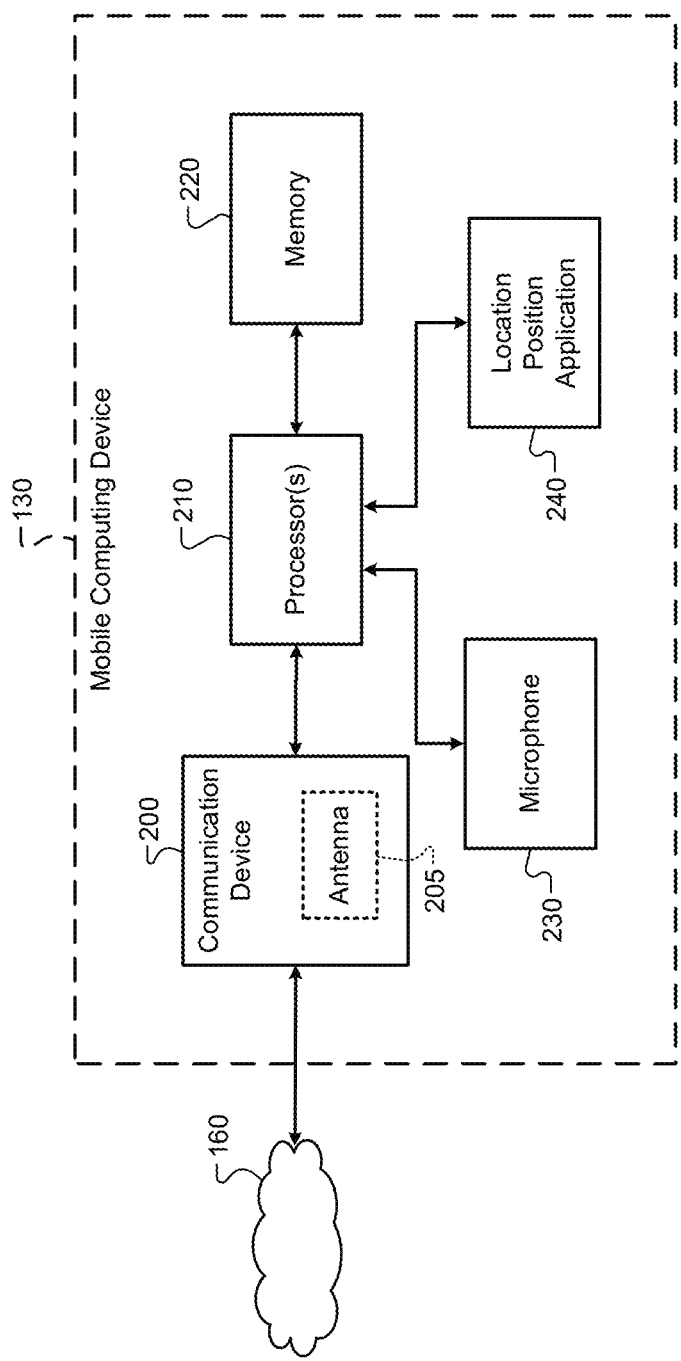
FIG. 2 is a functional block diagram of the example mobile computing device of FIG. 1.

A functional block diagram of an example mobile computing device 130 is illustrated in FIG. 2. The mobile computing device 130 can include a communication device 200, one more processors 210, a memory 220, a microphone 230, and a location position application 240. The processor(s) 210 can control operation of the mobile computing device 130, including implementing at least a portion of the techniques of the present disclosure. The term "processor" as used herein is intended to refer to both a single processor and multiple processors operating together, e.g., in a parallel or distributed architecture.

The communication device 200 can be configured for communication with other devices (e.g., the server computing device 150 and/or beacons 110) via the network 160 or otherwise. The communication device 200 can include an antenna 205 configured to receive radio signals, as described more fully below. One non-limiting example of the communication device 200 is a transceiver, although other forms of hardware are within the scope of the present disclosure. The memory 220 can be any suitable storage medium (flash, hard disk, etc.) configured to store information. For example, the memory 220 may store a set of instructions that are executable by the processor 210, which cause the mobile computing device 130 to perform operations, e.g., such as the operations of the present disclosure. The microphone 230 is configured to receive audio signals, specifically including audio signals in the frequency range of 16 kHz to 24 kHz, although other frequencies could be implemented.

Figure 3:
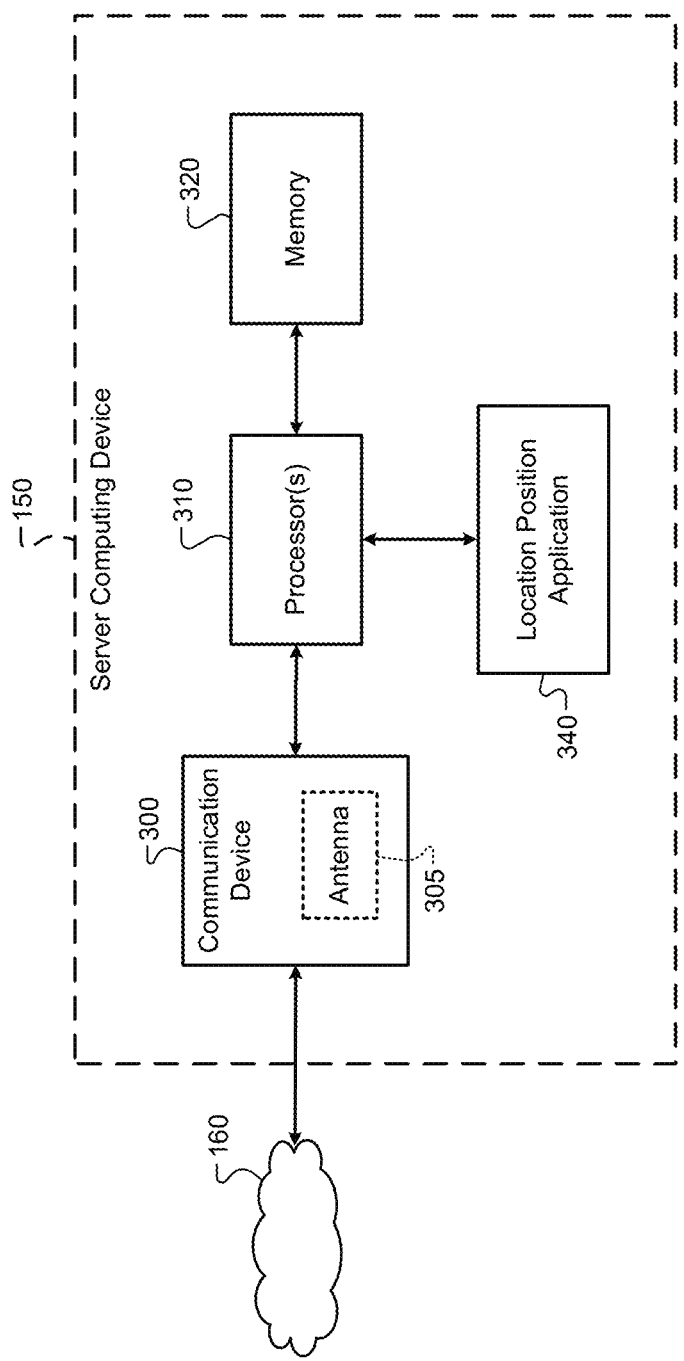
FIG. 3 is a functional block diagram of the example server computing device of FIG. 1.

Referring now to FIG. 3, a functional block diagram of an example server computing device 150 is illustrated. The example server computing device 150 can include the same or similar components as the computing device 130, and thus can be configured to perform some or all of the techniques of the present disclosure. In the illustrated example, server computing device 150 includes a communication device 300, one more processors 310, a memory 320, and a location position application 340. The processor(s) 310 can control operation of the server computing device 150, including implementing at least a portion of the techniques of the present disclosure. As mentioned above, the term "processor" as used herein is intended to refer to both a single processor and multiple processors operating together, e.g., in a parallel or distributed architecture. The communication device 300 can be configured for communication with other devices (e.g., the mobile computing device 130 and/or beacons 110) via the network 160 or otherwise. The communication device 300 can include an antenna 305 configured to receive radio signals, and can take the form of a transceiver or similar hardware component. The memory 320 can be any suitable storage medium (flash, hard disk, etc.) configured to store information. For example, the memory 320 may store a set of instructions that are executable by the processor 310, which cause the server computing device 150 to perform operations, e.g., such as the operations of the present disclosure.

It should be appreciated that, while the techniques of the present disclosure are described herein in the context of a mobile computing device 130 and/or a server computing device 150, it is specifically contemplated that each feature of the techniques may be performed by a mobile computing device 130 alone, a plurality of mobile computing devices 130 operating together, a server computing device 150 alone, a plurality of server computing devices 150 operating together, and a combination of one or more mobile computing devices 130 and one or more server computing devices 150 operating together.

Figure 4:
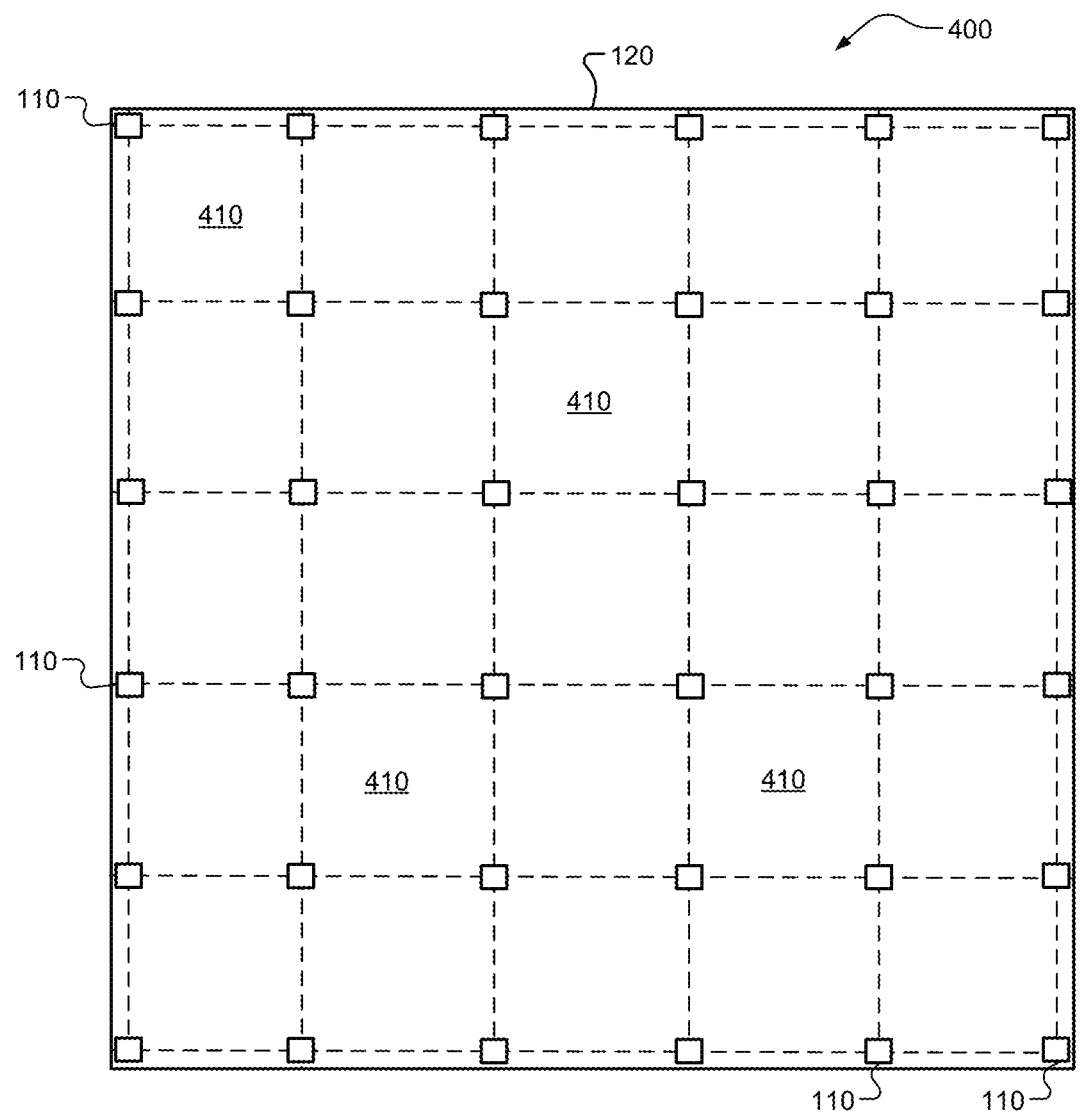
FIG. 4 is a partial schematic diagram of an example location area with a plurality of beacons arranged therein according to a grid formation according to some implementations of the present disclosure.

A partial schematic diagram of a location area 120 with a plurality of beacons 110 arranged therein is shown in FIG. 4. The plurality of beacons 110 can be arranged in a grid formation 400 that, in the illustrated example, comprises a 6×6 square pattern. In some aspects, the grid formation 400 can be divided into a plurality of sub-grids 410. Each sub-grid 410 can be associated with a set of sub-grid beacons 110 of the plurality of beacons 110. In the illustrated example, each of the sub-grids 410 is associated a set of four sub-grid beacons 110 arranged at the corners of the sub-grid 410. It should be appreciated that other shapes, sizes, arrangements, etc. of the grid formation are within the scope of the present disclosure. For example only, in some implementations a sub-grid 410 can be associated with a set of nine sub-grid beacons 110 arranged in a 3×3 pattern.

Figure 5A:
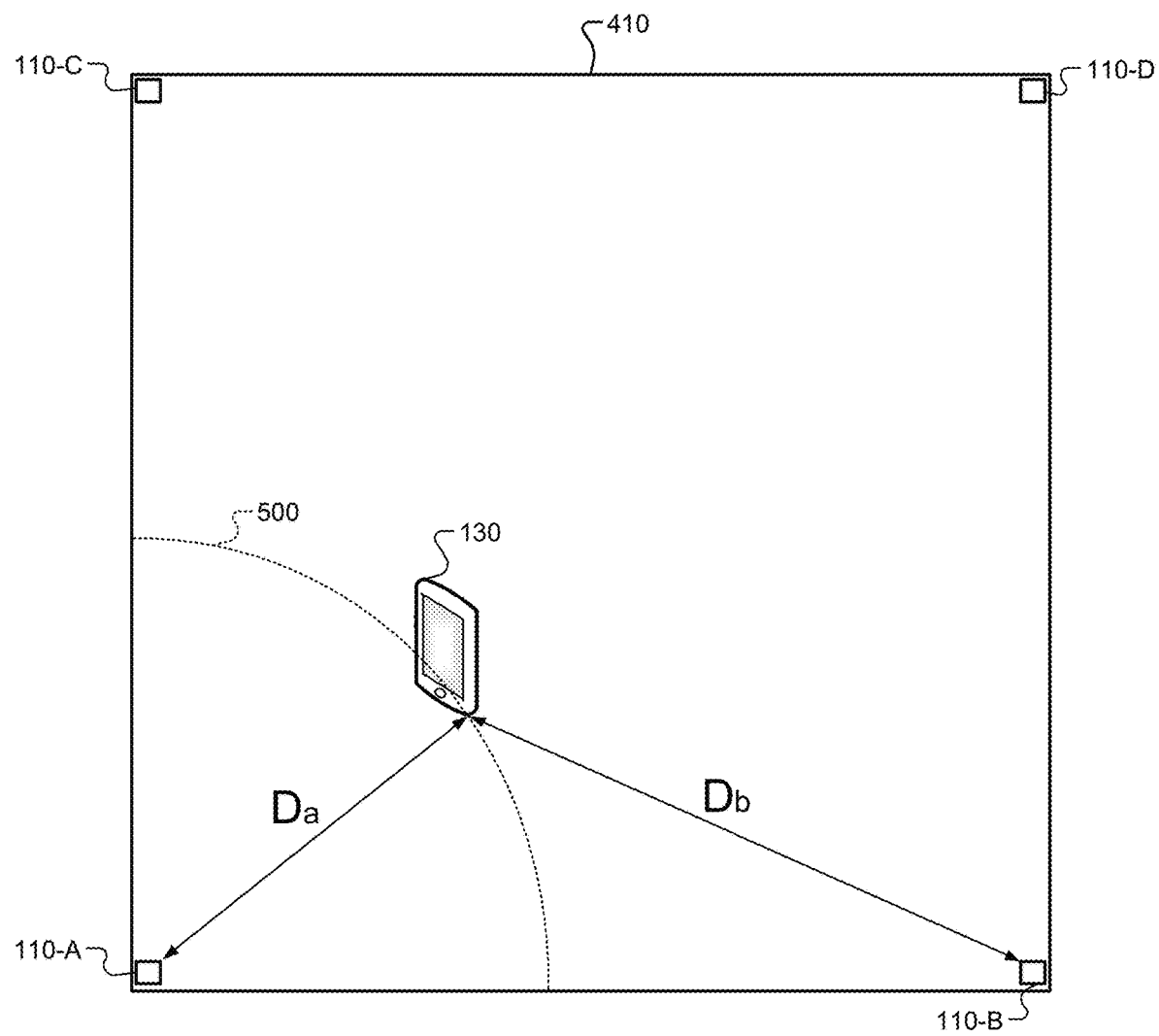
FIGS. 5A and 5B are schematic diagrams of a sub-grid of the example grid formation of FIG. 4.
Figure 5B:
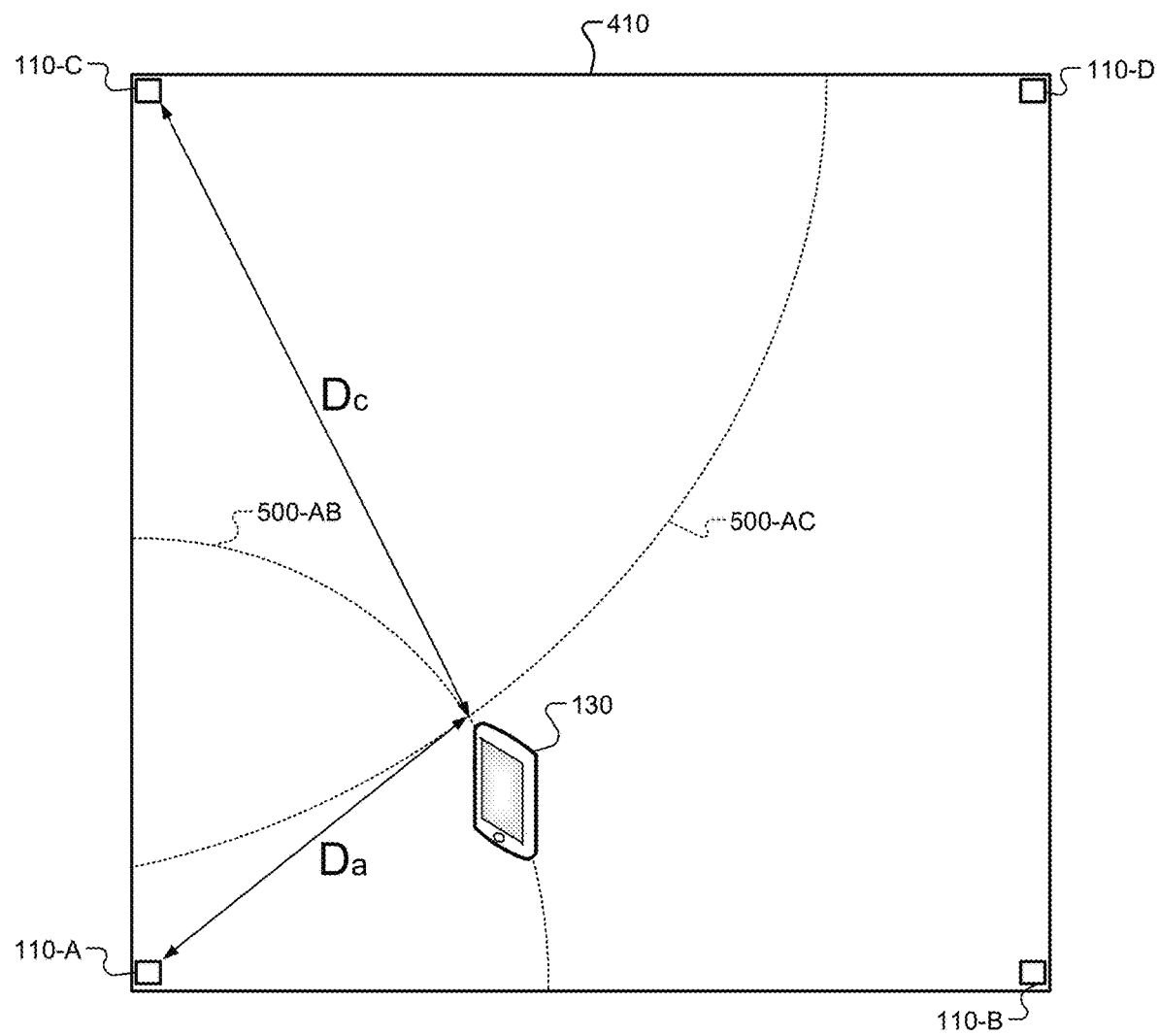

With additional reference to FIGS. 5A and 5B, the basic principle of determining a position of a mobile computing device 130 according to some aspects of the present disclosure can be illustrated. The mobile computing device 130 can uses audio signals (such as ultrasound signals) transmitted from a set of two or more beacons 110. In the illustrated example, there are two beacons 110-A and 110-B shown, with the corresponding distances from the beacons 110-A, 110-B to the mobile computing device 130 being represented by distances $D_a$ and $D_b$, respectively. The mobile computing device 130 can measure the time difference between when the signal is received from each of the set of beacons 110. Once this difference is adjusted by the predetermined delay, if any (e.g., resulting from the beacons 110 not transmitting their audio signals at the same time), and multiplied by the speed of sound, the difference in distance between $D_a$ and $D_b$ (e.g., "$D_a-D_b$" or "$D_b-D_a$") can be determined. The difference in distance can be utilized to determine an arc 500-AB on which all possible locations of the mobile computing device 130 are present. Further, the mobile computing device 130 can also utilize the difference between a different set of beacons 110 (e.g., beacons 110-A and 110-C as illustrated) to determine a second arc 500-AC (FIG. 5B). The intersection of the arcs 500-AB and 500-AC corresponds to the location of the mobile computing device 130 within the sub-grid 410. In additional or alternative implementations, a trigonometric approach may be utilized in which distances from three beacons 110 can be utilized to determine the position of the mobile computing device 130.

In order to determine its position in the location area 120, a mobile computing device must be provided with sufficient information regarding the setup of the grid formation 400 and the beacons 110. Such information will be referred to as grid formation setup data. The grid formation setup data can include information sufficient to identify the grid formation, and which sub-grid beacon 110 of the set of sub-grid beacons 110 corresponds to a received audio signal. For example only, the grid formation setup data can include the precise position of each of the beacons 110 in the system 100, as well as information regarding the transmission details (e.g., frequency, delay, and transmission order) of the transmitted audio signals.

In some aspects, the mobile computing device 130 can retrieve the grid formation setup data from a server computing device 150. For example only, the mobile computing device 130 can receive a radio signal from one of the beacons 110 upon entering the location area 120. The radio signal can include a data component that uniquely identifies the beacon 110 and location area 120. The mobile computing device 130 can decode or otherwise acquire the data component and transmit the data component to a server computing device 150. Upon receipt of the data component, the server computing device 150 can transmit the grid formation setup data to the mobile computing device 130. Additionally or alternatively, the data component can include some or all of the grid formation setup data such that the mobile computing device 130 can directly obtain the grid formation setup data from the beacon 110. It should be appreciated that other techniques for the mobile computing device 130 to be provisioned with the grid formation setup data can be utilized with the present disclosure. For example only, in some aspects the mobile computing device 130 can be provisioned with the grid formation setup data by the user 140 downloading the location position application 240 or other application (an application associated with a retail store, etc.).

Figure 6:
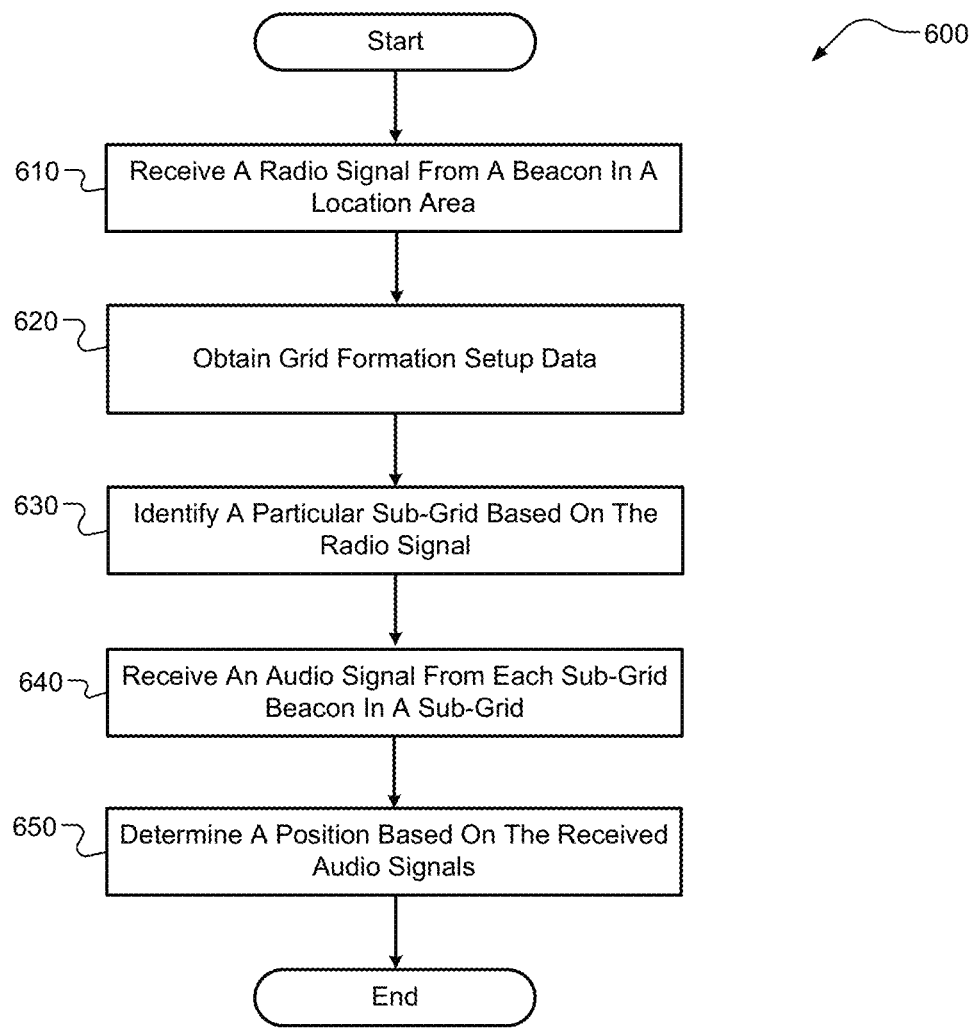
FIG. 6 is a flowchart of an example method of determining a position of a mobile computing device utilizing a location position application according to some implementations of the present disclosure.

Referring now to FIG. 6, a flowchart of an example method 600 of determining a position of a mobile computing device 130 utilizing a location position application according to some implementations of the present disclosure is illustrated. The method 600 can be performed by the location position system 100 and any computing device or devices therein, such as mobile computing device 130, server computing device 150, and/or a combination thereof. For ease of description, the method 600 will be described hereinafter as being performed by a single mobile computing device. It should be appreciated, however, that other devices may be utilized to perform some or all of the described method 600. Furthermore, the method 600 will be described as being performed in a location area 120 in which a plurality of beacons 110 are arranged. As described above, the plurality of beacons 110 can be arranged in a grid formation 400 that is divided into a plurality of sub-grids 410.

At 610, the mobile computing device 130 can receive a radio signal from a particular beacon 110 of the plurality of beacons 110 in the location area 120. The radio signal can comprise a data component uniquely identifying the particular beacon 110. In some aspects, the beacon 110 can comprise a Bluetooth™ Low Energy ("BLE") beacon, although other types of radio signals could be utilized. At 620, the mobile computing device 130 can obtain grid formation setup data regarding the location area 120 and the plurality of beacons 110. In some aspects, in addition to data uniquely identifying the particular beacon 110 from which it was received, the data component can include some or all of the grid formation setup data. Alternatively or additionally, some or all of the grid formation setup data can be received from the server computing device 150, e.g., by the mobile computing device 130 transmitting the data component to the server computing device 150 and the server computing device 150, in response thereto, transmitting the grid formation setup data to the mobile computing device 130. As described above, the grid formation setup data includes the information sufficient to identify the grid formation 400 and which sub-grid beacon 110 of the set of sub-grid beacons 110 corresponds to a received audio signal.

At 630, the mobile computing device 130 can identify in which particular sub-grid 410 of the grid formation 400 it is located based on the received radio signal. In some aspects, the BLE protocol can provide rough location information for the mobile computing device 130, which can be utilized to identify the particular sub-grid 410. It should be appreciated that the use of radio signal(s) (BLE or otherwise) can be inaccurate, unreliable, or otherwise undesirable for fully implementing the location position techniques of the present disclosure. Nonetheless, the techniques of the present disclosure leverage the rough positioning information provided by the BLE protocol or other solely radio signal based positioning protocols to assist in fully implementing the location position system 100. The particular sub-grid 410 identified at 630 can be associated with a set of sub-grid beacons 110 of the plurality of beacons 110 (See, e.g., FIGS. 5A and 5B).

The mobile computing device 130 can receive (640) an audio signal from each of the set of sub-grid beacons 110. Each of the audio signals can have a frequency in the frequency range of 16 kHz to 24 kHz and a transmission delay from a reference time, as more fully described below. In some implementations, the audio signals will not include any encoded data or other form of identifying data, except for a frequency. Further, the audio signals can be separately transmitted from the radio signal transmitted by the particular beacon 110. At 650, the mobile computing device 130 can determine its position based on the received audio signals, as described more fully herein.

The beacons 110 can be controlled (e.g., by the server computing device 150 or otherwise) to coordinate the transmission of audio signals according to a transmission scheme that can be identified in the grid formation setup data. The transmission scheme can control the transmission details of each beacon 110. The transmission details can include, inter alia, the frequency of the audio signal transmitted from each beacon 110, the transmission delay from a reference time (e.g., beginning of cycle) of the transmission of the audio signal from each beacon 110, and/or a transmission order of audio signals from the beacons 110.

In some implementations, the set of beacons 110 (or sub-grid beacons 110) can transmit audio signals having a common frequency and different transmission delays such that the mobile computing device 130 can determine from which beacon 110 each audio signal has been transmitted. In other implementations, the set of beacons 110 (or sub-grid beacons 110) can transmit audio signals having different frequencies and a common transmission delay such that the mobile computing device 130 can determine from which beacon 110 each audio signal has been transmitted. In yet another aspect, the set of beacons 110 (or sub-grid beacons 110) can transmit audio signals having different frequencies and different transmission delays such that the mobile computing device 130 can determine from which beacon 110 each audio signal has been transmitted. An example transmission scheme will be described in reference to FIG. 7. It should be appreciated that the described transmission scheme is merely an example, and that other transmission schemes could be implemented.

Figure 7:
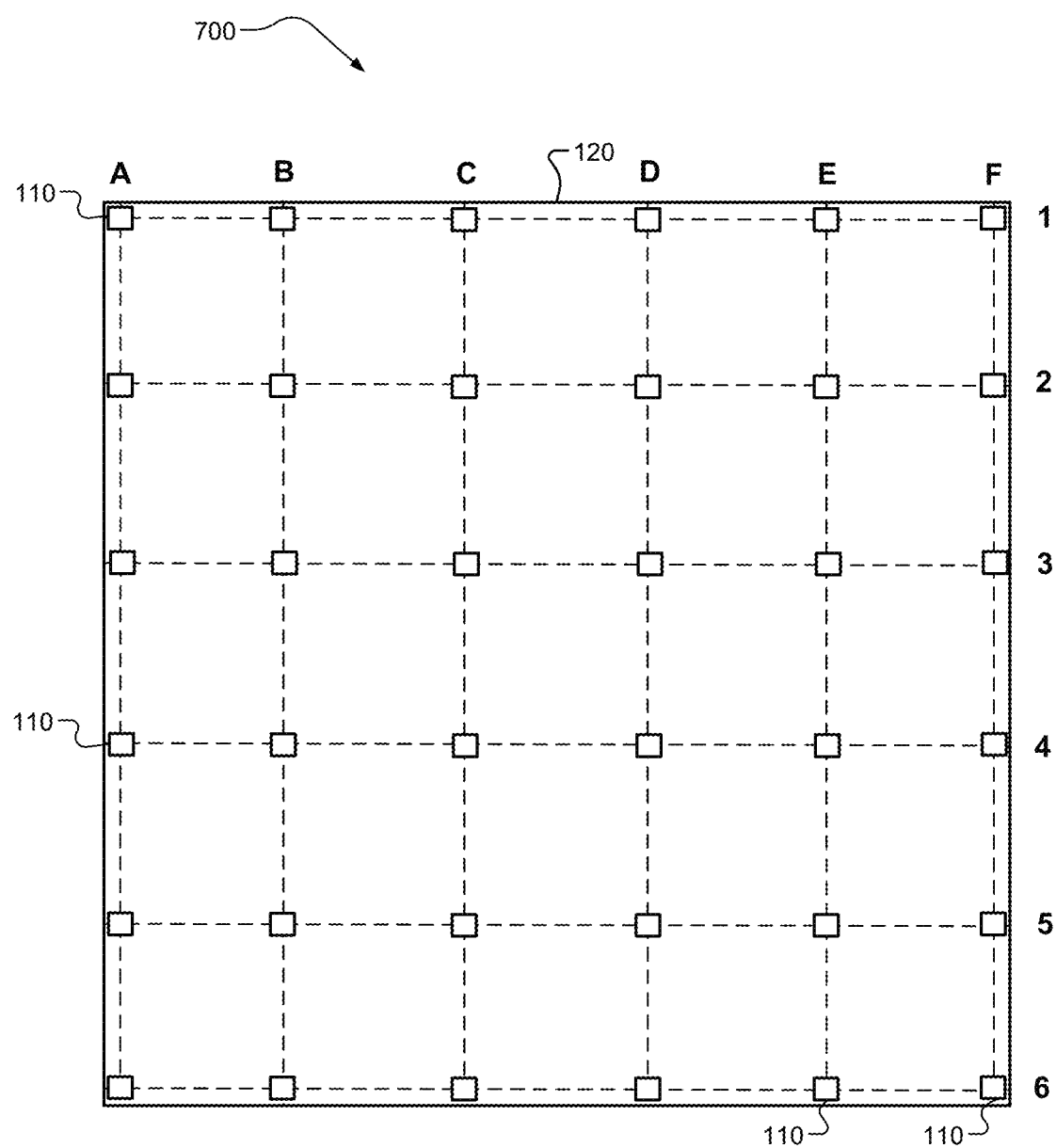
FIG. 7 is a partial schematic diagram of another example location area with a plurality of beacons arranged therein according to a grid formation according to some implementations of the present disclosure.

Referring now to FIG. 7, an example grid formation 700 in an area location 120 will be utilized to describe an example implementation of the transmission details for a location position system 100. The grid formation 700 includes a plurality of beacons 110 arranged in rows 1-6, and columns A-F. An example transmission scheme can be implemented in the grid formation 700 such that interference between the beacons 110 and the transmitted audio signals can be reduced/eliminated. The grid formation 700 can be arranged, e.g., such that the beacons are approximately fifty (50) feet apart from each other. Due to noise and other environmental factors, the calibration of the beacons 110 should include some margin of error to ensure sufficient signal strength. Therefore, in such a configuration, the audio signal transmitted by a beacon 110 can be calibrated to become undetectable by the mobile computing device 130 after a distance of between eighty to one hundred feet. Accordingly, the transmission scheme should be implemented such that interference between adjacent beacons 110 is reduced based on this calibration.

According to one example transmission scheme, each beacon 110 can transmit an audio signal at one of 19 kHz, 20 kHz, 21 kHz, 22 kHz, 23 kHz, or 24 kHz, and at a delay from a reference time in increments of 100 milliseconds. The beacons 110 can arranged to transmit audio signal according to transmission details arranged in a repeated pattern across the grid formation 700. For example only, the transmission details for the grid pattern 700 can be arranged as follows:

| A1: | B1: | C1: | D1: | E1: | F1: |
|---|---|---|---|---|---|
| 19 kHz, 0 ms | 20 kHz, 0 ms | 19 kHz, 100 ms | 20 kHz, 100 ms | 19 kHz, 0 ms | 20 kHz, 0 ms |
| A2: | B2: | C2: | D2: | E2: | F2: |
| 22 kHz, 0 ms | 21 kHz, 0 ms | 22 kHz, 100 ms | 21 kHz, 100 ms | 22 kHz, 0 ms | 21 kHz, 0 ms |
| A3: | B3: | C3: | D3: | E3: | F3: |
| 19 kHz, 100 ms | 20 kHz, 100 ms | 19 kHz, 0 ms | 20 kHz, 0 ms | 19 kHz, 100 ms | 20 kHz, 100 ms |
| A4: | B4: | C4: | D4: | E4: | F4: |
| 22 kHz, 100 ms | 21 kHz, 100 ms | 22 kHz, 0 ms | 21 kHz, 0 ms | 22 kHz, 100 ms | 21 kHz, 100 ms |
| A5: | B5: | C5: | D5: | E5: | F5: |
| 19 kHz, 0 ms | 20 kHz, 0 ms | 19 kHz, 100 ms | 20 kHz, 100 ms | 19 kHz, 0 ms | 20 kHz, 0 ms |
| A6: | B6: | C6: | D6: | E6: | F6: |
| 22 kHz, 0 ms | 21 kHz, 0 ms | 22 kHz, 100 ms | 21 kHz, 100 ms | 22 kHz, 0 ms | 21 kHz, 0 ms |

In this example, each beacon 110 will transmit an audio signal different from each of its two closest, adjacent beacons 110, by a different frequency and/or a different delay. In this manner, the mobile computing device 130 can identify a particular beacon 110 based on the transmission details of a received audio signal.

In implementations where different frequencies but a common transmission delay (common transmission time) are used for the audio signals, the mobile computing device 130 can determine from which beacon 110 an audio signal was transmitted based solely on the frequency. In implementations where different transmission delays are used, the location position system 100 can be configured such that beacons 110 transmit audio signals in a sequence with a common delay increment (such as 100 ms) between signals in the sequence. Each sequence can be delayed by a larger increment (such as 200 ms) such that the mobile computing device 130 can identify the first, second, etc. transmitted audio signal in the sequence.

Figure 8:
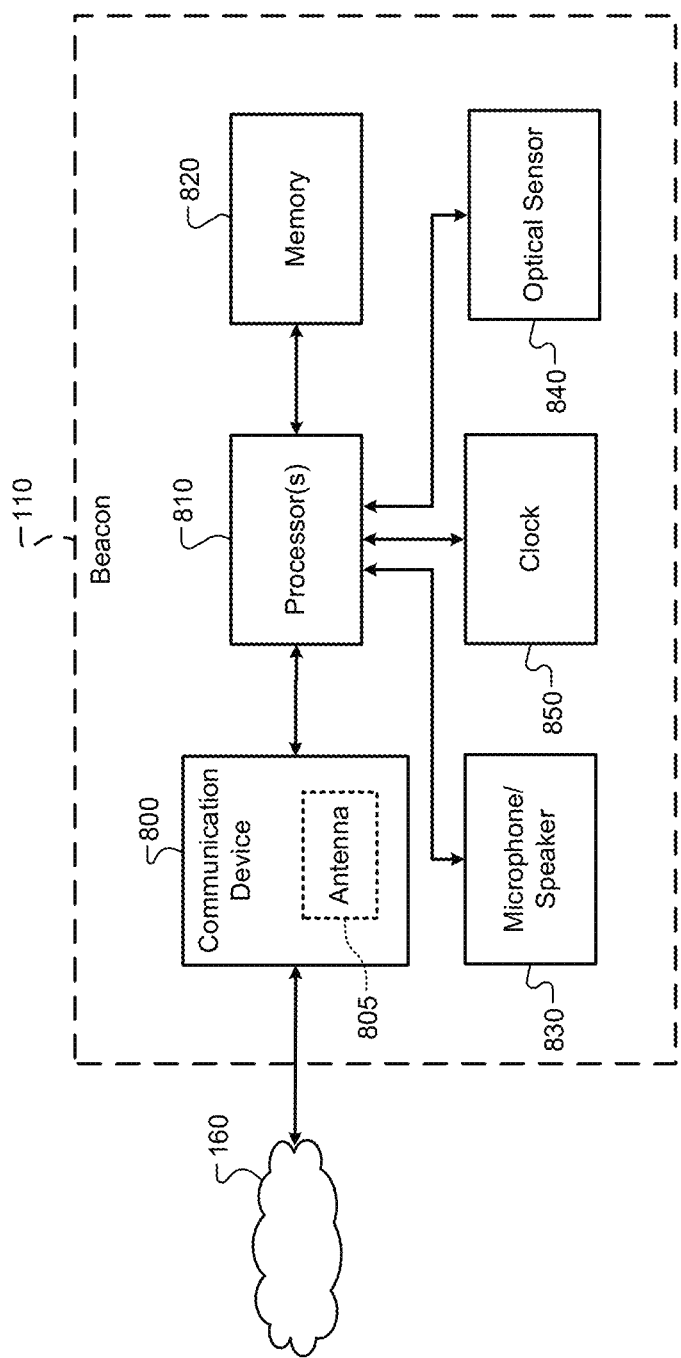
FIG. 8 is a functional block diagram of an example beacon according to some implementations of the present disclosure.

The grid formation 400, 700 can be configured by a user or administrator of the location position system 100. In some implementations, and with reference to FIG. 8, the beacons 110 can include various hardware components to assist in the setup, configuration, and operation of the beacons 110. For example only, each beacons 110 may include a communication device 800, one or more processors 810, a memory 820, a microphone and/or speaker 830, an optical sensor 840, and/or an internal clock 850. The processor(s) 810 can control operation of the beacon 110, including implementing at least a portion of the techniques of the present disclosure. The term "processor" as used herein is intended to refer to both a single processor and multiple processors operating together, e.g., in a parallel or distributed architecture.

The communication device 800 can be configured for communication with other devices (e.g., the server computing device 150 and/or mobile computing device 130) via the network 160 or otherwise. The communication device 800 can include an antenna 805 configured to receive radio signals. One non-limiting example of the communication device 200 is a transceiver, although other forms of hardware are within the scope of the present disclosure. The memory 820 can be any suitable storage medium (flash, hard disk, etc.) configured to store information. For example, the memory 820 may store a set of instructions that are executable by the processor 810, which cause the beacon 110 to perform operations, e.g., such as the operations of the present disclosure.

The microphone/speaker 830 can be configured to receive and/or output audio signals, specifically including audio signals in the frequency range of 16 kHz to 24 kHz, although other frequencies could be implemented. The optical sensor 840 can receive optical signals (infrared light, laser pulses, etc.), which can be used to synchronize or otherwise control the operation of the beacon 110. The clock 850 can be used by the processor 810 to control the timing and operation of the beacon 110, such as the timing of the output of the audio signals.

During setup of the location position system 100, an administrator can fixedly secure each of the beacons 110 at a physical location in the location area 120. The administrator can then input the coordinates of each of the beacons 110 into the location position system 100 (e.g., server computing device 150), as well as the transmission details for each of the beacons 110. In some implementations, the coordinates of the beacons 110 can be physically measured by the administrator, such as with tape measures, laser distance devices, or other measurement devices.

In additional or alternative implementations, the beacons 110 can be self-configuring. For example only, the beacons 110 can utilize the communication device 800 and/or microphone/speakers 830 to perform a location determination process, similar to that described above with respect to that used during operation of the location position system 100. In such a process, at least two beacons 110 of the location position system 100 can be arranged and positioned as anchor beacons to construct the coordinate system. For example only, the position of the two anchor beacons 110 can be considered to be located at (0,0) and (0,d), where "d" is the distance between the beacons 110. The distance d can, e.g., by determined by a distance measuring algorithm based on transmission of audio signals between the two anchor beacons 110, although other forms of determining the distance d can be utilized. From these two anchor beacons 110, the position of all other beacons 110 can be determined.

Figure 9A:
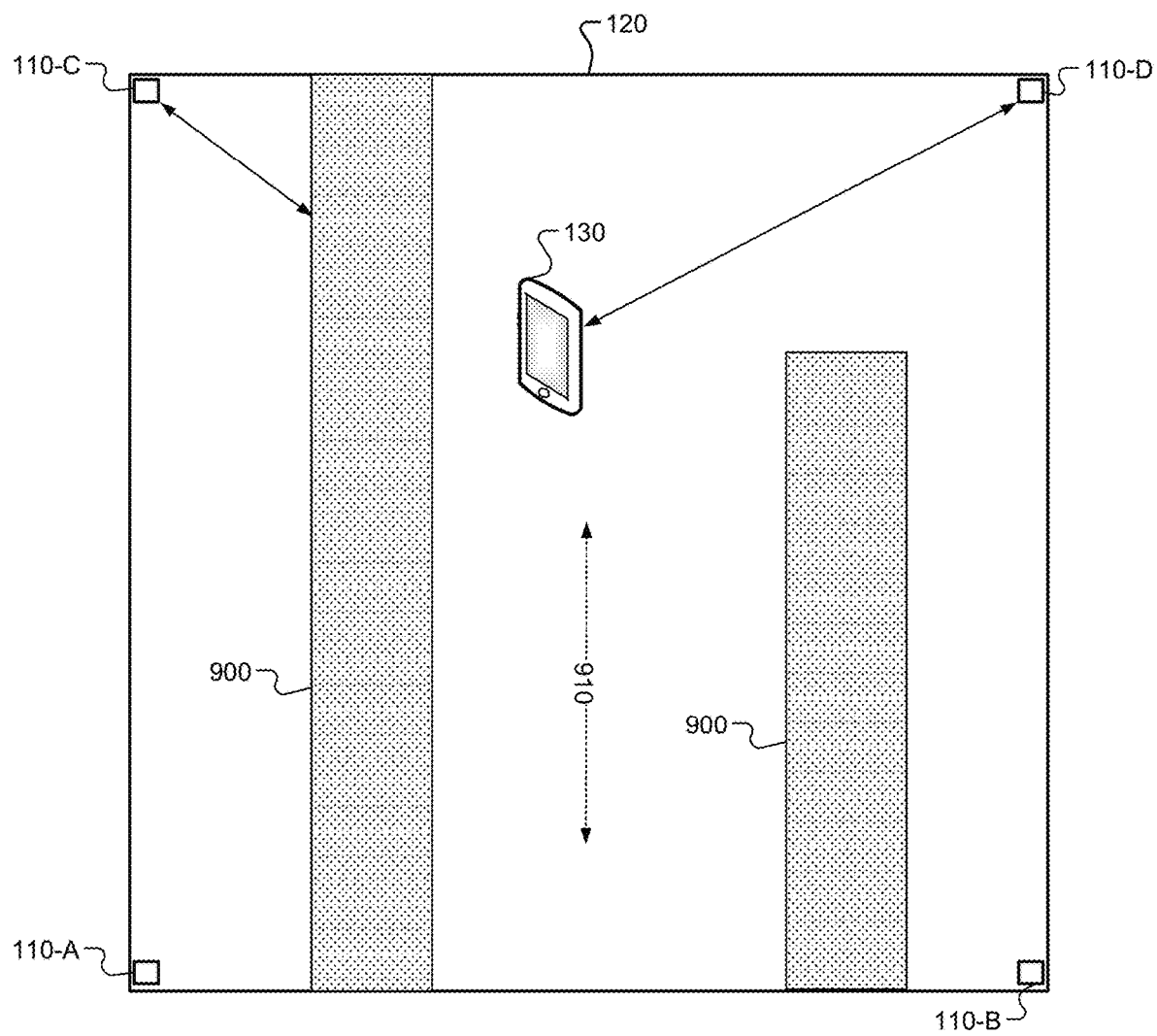
FIGS. 9A and 9B are overhead and side views, respectively, of an example location area in which an example indoor location position system is arranged according to some implementations of the present disclosure.
Figure 9B:
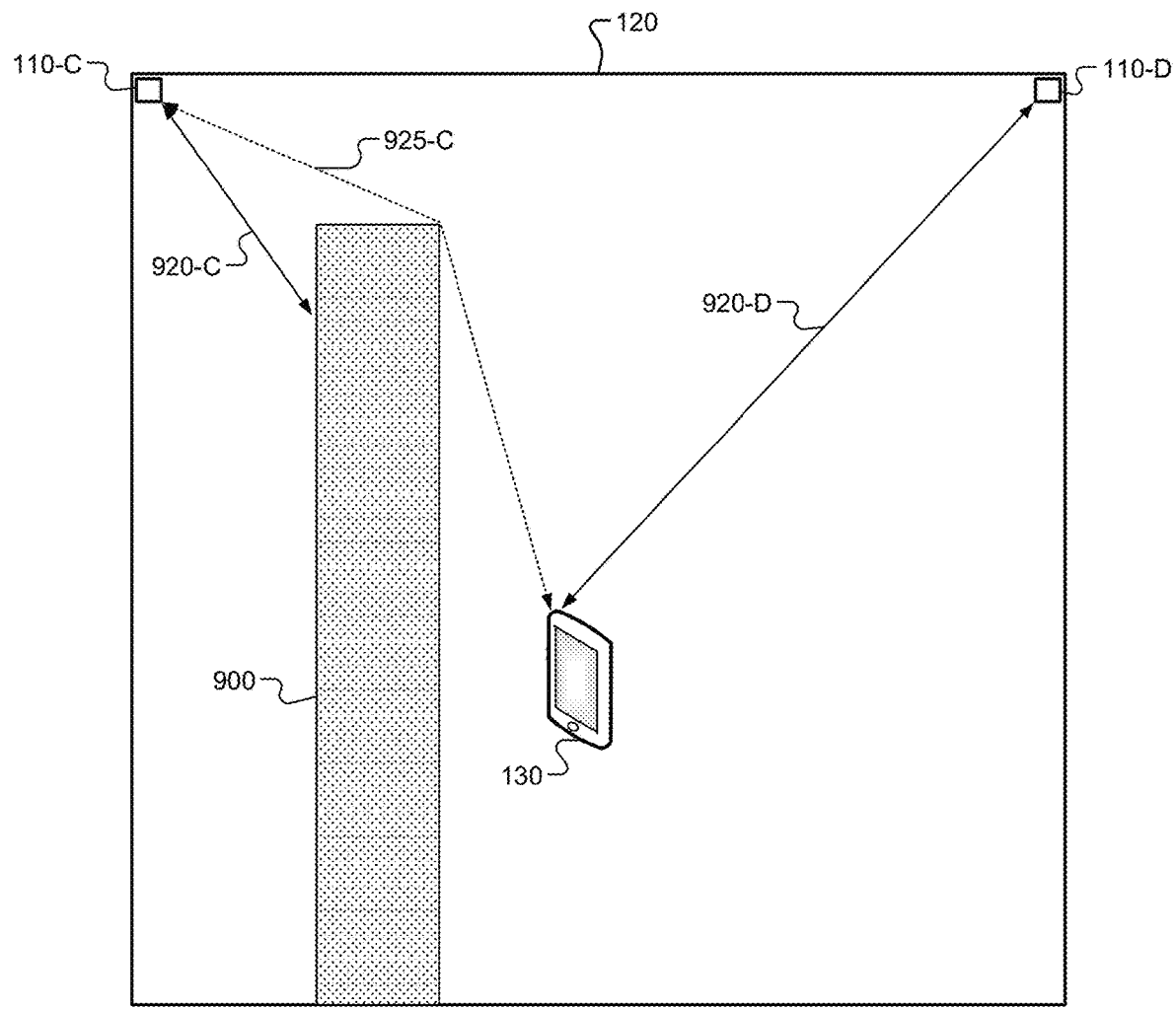

In some aspects, the operation of the location position system 100 can be further improved to provide for known anomalies in a particular location area 120. For example only, the location position system 100 may be less accurate than desired in location positions in which the line-of-sight between one beacon 110 and a mobile computing device 130 is impeded by an obstacle or barrier, and the line-of-sight between another beacon 110 and the mobile computing device 130 is clear. With reference to FIGS. 9A and 9B, an example location area 120 may correspond to a retail location that includes one or more obstacles 900, such as a display rack that defines an aisle 910. As shown in FIG. 9B, an obstacle 900 may impede the line-of-sight 920-C from a beacon 110-C, while the line-of-sight 920-D from a beacon 110-D is not blocked or impeded. Due to the obstacle 900, the audio signal output from beacon 110-C will travel along path 925-C instead of line-of-sight 920-C, which results in an increased travel distance and therefore increased delay, which will provide inaccuracies in the system 100.

In order to compensate for such delay, the location position system 100 can includes line-of-sight compensation data in the grid formation setup data that can be used by the mobile computing device 130 to determine a more accurate position in such areas. In one aspect, the line-of-sight compensation data can include: (i) one or more obstacle areas in which line-of-sight is blocked/impeded, and (ii) an associated delay factor for each obstacle area. In such areas, the mobile computing device 130 can determine its position by determining an initial position based on received audio signals, described above. The initial position can be compared to the one or more obstacle areas in the line-of-sight compensation data. When the initial position is determined to not be within an obstacle area, the initial position can be utilized as the determined position for the mobile computing device 130.

When the initial position is determined to be within an obstacle area, however, performing line-of-sight compensation will be desirable/appropriate. Accordingly, the mobile computing device 130 can adjust the time of arrival of any audio signal that is blocked/impeded by its associated delay factor to obtain an adjusted audio signal. The mobile computing device 130 can then utilize the adjusted audio signal(s) to determine the actual position of the mobile computing device 130. In some aspects, such line-of-sight compensation will be performed only for those obstacle areas in which line-of-sight differs between the beacons 110 of interest. For example only, if line-of-sight from both beacons 110 of interest is impeded/blocked, the mobile computing device 130 may not perform line-of-sight compensation since the delays will cancel each other. If, however, line-of-sight from one beacon 110-C is impeded/blocked, while line-of-sight is open from the other beacon 110-D, the mobile computing device 130 may perform the line-of-sight compensation described above.

In various implementations, the operation of the location position system 100 can be improved by including a bearing/heading determination process. For example only, the grid formation setup data can include one or more tracks or predetermined pathways (such as aisle 910) on which the mobile computing device 130 can travel. The mobile computing device 130 can use this predetermined pathway data in various ways to improve the accuracy of the system 100.

For example only, the mobile computing device 130 can include one or more gyroscopes (not shown) for measuring its angular velocity. The mobile computing device 130 can, in some aspects, utilize the predetermined pathways to calibrate the measurements of the gyroscope in order to provide the heading/orientation of the mobile computing device 130. As the mobile computing device 130 determines a change of its position over a certain distance, the measurement of the gyroscope can be calibrated. The mobile computing device 130 can use the calibrated gyroscope to determine a calibrated heading/orientation, which can be used to more accurately determine its position. As the mobile computing device 130 is unlikely to make sudden (within 100 ms periods), substantial changes to its determined position and/or heading, a determined position from a single pair of beacons 110 or calculation that are in conflict with its determined heading and/or position can be discarded as anomalous positions that are in error (e.g., due to noise, interference, or other factors). Furthermore, in some aspects, the mobile computing device 130 can utilize the calibrated gyroscope to provide not only provide a more accurate position of the mobile computing device 130, but also an accurate and up-to-date heading/orientation. In other aspects, the mobile computing device 130 can utilize the predetermined pathways to determine that a determined position from a single pair of beacons 110 or calculation is anomalous and can be discarded because the determined position is in conflict with a known obstacle. In this manner, the mobile computing device 130 can utilize the predetermined pathways to determine its position to a high degree of accuracy.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A location position system, comprising:
  a plurality of beacons arranged in a location area, the plurality of beacons being arranged in a grid formation divided into a plurality of sub-grids; and
  a mobile computing device implementing a location position application, the mobile computing device comprising:
    at least one microphone configured to receive audio signals in a frequency range of 16 kHz and above to 24 kHz,
    at least one antenna configured to receive radio signals,
    one or more processors coupled to the at least one microphone and the at least one antenna and configured to receive the audio signals and the radio signals, and
    a non-transitory computer-readable storage medium having a plurality of instructions stored thereon, which, when executed by the one or more processors, cause the one or more processors to perform operations comprising:
      receiving a radio signal from a particular beacon of the plurality of beacons, the radio signal comprising a data component uniquely identifying the particular beacon;
      identifying a particular sub-grid of the plurality of sub-grids in the grid formation based on the received radio signal, the particular sub-grid being associated with a set of sub-grid beacons of the plurality of beacons;
      receiving an audio signal from each of the set of sub-grid beacons, each audio signal: (i) having a frequency in the frequency range of 16 kHz to 24 kHz and a transmission delay from a reference time, (ii) lacking any additional identifying data, and (iii) being separately transmitted from the radio signal transmitted by the particular beacon; and
      determining a position of the mobile computing device based on the received audio signals,
    wherein:
    identifying the particular sub-grid of the plurality of sub-grids in the grid formation is further based on grid formation setup data, the grid formation setup data being sufficient to identify: (i) the grid formation, and (ii) which sub-grid beacon of the set of sub-grid beacons corresponds to a received audio signal;
    the grid formation setup data includes line-of-sight compensation data; and
    determining the position of the mobile computing device based on the received audio signals comprises:
      determining an initial position estimate based on the received audio signals;
      determining whether line-of-sight compensation is appropriate based on the initial position and the line-of-sight compensation data; and
      when line-of-sight compensation is appropriate, adjusting a time of arrival for at least one of the received audio signals to obtain one or more time adjusted audio signals, wherein determining the position of the mobile computing device is based on the received one or more time adjusted audio signals.

2. The location position system of claim 1, wherein the operations further comprise:
  transmitting the data component to a server computing device associated with the location position system;

receiving, from the server computing device and in response to transmitting the data component, the grid formation setup data.

3. The location position system of claim 1, wherein the set of sub-grid beacons comprises four beacons.

4. The location position system of claim 1, wherein the data component further includes the grid formation setup data.

5. The location position system of claim 1, wherein the mobile computing device comprises a mobile phone.

6. The location position system of claim 1, wherein the audio signals received from the set of sub-grid beacons have different frequencies and a common transmission delay.

7. The location position system of claim 1, wherein the audio signals received from the set of sub-grid beacons have different frequencies and different transmission delays.

* * * * *